US012748819B2

(12) United States Patent
Sachtjen et al.

(10) Patent No.: US 12,748,819 B2
(45) Date of Patent: Sep. 29, 2026

(54) REDUCING UTILIZATION OF COMPUTATIONAL RESOURCES ASSOCIATED WITH SEGMENTING DATASETS VIA A CLUSTER-ENSEMBLE MODEL SYSTEMS AND METHODS

(71) Applicant: Capital One Services, LLC, McLean, VA (US)

(72) Inventors: Brian Sachtjen, McLean, VA (US); Guoliang Ding, McLean, VA (US); Lawrence Price, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 187 days.

(21) Appl. No.: 18/490,252

(22) Filed: Oct. 19, 2023

(65) Prior Publication Data

US 2025/0131063 A1 Apr. 24, 2025

(51) Int. Cl.
*G06N 20/20* (2019.01)
*G06F 18/23211* (2023.01)

(52) U.S. Cl.
CPC ........ *G06F 18/23211* (2023.01); *G06N 20/20* (2019.01)

(58) Field of Classification Search
CPC .......................... G06F 18/23211; G06N 20/20
See application file for complete search history.

(56) References Cited

U.S. PATENT DOCUMENTS

| | | | | |
|---|---|---|---|---|
| 10,867,246 | B1 * | 12/2020 | Nguyen | G06N 3/045 |
| 2011/0295892 | A1 * | 12/2011 | Evans | G06F 16/951 707/E17.107 |
| 2015/0286704 | A1 * | 10/2015 | Shyr | G06F 16/35 707/737 |
| 2020/0104697 | A1 * | 4/2020 | Bhatia | G06N 3/0895 |
| 2023/0351155 | A1 * | 11/2023 | Lohia | G06N 3/044 |
| 2024/0029135 | A1 * | 1/2024 | Katz | G06Q 30/0631 |
| 2024/0089336 | A1 * | 3/2024 | Schlerf | H04L 67/535 |
| 2024/0386325 | A1 * | 11/2024 | Yu | G06N 3/045 |
| 2024/0419985 | A1 * | 12/2024 | Lackritz | G06N 20/00 |
| 2025/0005612 | A1 * | 1/2025 | Maloney | G06N 7/01 |

* cited by examiner

*Primary Examiner* — Grace Park
(74) *Attorney, Agent, or Firm* — Foley & Lardner LLP

(57) ABSTRACT

In some embodiments, reducing utilization of computational resources associated with segmenting datasets via a cluster-ensemble model may be facilitated. In some embodiments, the system may receive a raw dataset having a first dimension. The system may then embed the raw dataset into an embedded dataset having a second dimension, where the embedded dataset comprises a vector embedding. The system may then provide the embedded dataset to a set of clustering models to generate a set of clusters, where each cluster of the set of clusters corresponds to a respective clustering model of the set of clustering models. The system may provide the set of clusters to a cluster-ensemble model to generate a set of ensemble-clusters. Based on the set of ensemble-clusters, the system may generate a set of data segments corresponding to the set of ensemble-clusters indicating at least one characteristic of a respective ensemble-cluster of the set of ensemble-clusters.

20 Claims, 5 Drawing Sheets

200

100

500

REDUCING UTILIZATION OF COMPUTATIONAL RESOURCES ASSOCIATED WITH SEGMENTING DATASETS VIA A CLUSTER-ENSEMBLE MODEL SYSTEMS AND METHODS

BACKGROUND

Segmenting data provides useful insight to the underlying characteristics of the data itself. For example, data segmentation is the process of grouping data such that each group shares a common characteristic. By segmenting data, users are able to access specific groupings of data quickly to improve data analysis efficiency. Computing algorithms are often employed to segment data, however, as the amount of data increases, the effectiveness of accurately segmenting the data is decreased due to a large amount of similarities within the data itself and the current limitations of the computers which host such algorithms.

SUMMARY

Methods and systems are described herein for novel uses and/or improvements to segmenting data. As one example, methods and systems are described herein for reducing utilization of computational resources associated with segmenting datasets via a cluster-ensemble model.

Segmenting data is often a cumbersome process requiring exceptionally powerful processors and a large amount of computer memory resources, particularly in the context of "big data." For example, big data may refer to structured, semi-structured, or unstructured data that is large and complex, typically growing exponentially with respect to time. To segment data (or big data), existing approaches apply clustering algorithms to raw, unmodified datasets to cluster the raw data into one or more groups or categories. However, such clustering algorithms are limited by the processing power and the amount of available computer memory on the computers to which they are hosted. As the amount of data to be clustered (or segmented) increases, so does the need for more powerful computers to host complex clustering algorithms.

Furthermore, contrary to existing approaches that assume big data will provide better or more accurate data segments as opposed to smaller or modified datasets, existing clustering algorithms that attempt to process big data tend to produce meaningless data segments due to the sheer scale of potential similarities between data points within the data. This in turn leads to a waste in computer processing and memory resources by producing useless segments of big data.

Moreover, existing approaches to segment data rely on the "question first" model, where clustering models are specifically designed to segment data into a given category based on a question (e.g., "Who drinks coffee?"). While the "question first" model may provide insight regarding the question, the clustering algorithm is limited to only that question, requiring the generation and training of new algorithms specifically tailored to other questions-thereby wasting valuable computer processing and memory resources creating algorithms specifically tailored to a given domain and limiting the clustering algorithm to a specific question or domain.

To overcome these technical deficiencies, methods and systems disclosed herein provide a mechanism for reducing utilization of computational resources associated with segmenting datasets via a cluster-ensemble model. For example, by leveraging a cluster-ensemble model provided with an embedded dataset (e.g., as opposed to a raw dataset), the amount of computer processing and memory resources are reduced while enabling the generation of accurate and meaningful data segments.

For instance, by embedding a raw dataset into an embedded dataset, the system may dimensionally reduce the dataset, thereby reducing the amount of computer memory and computer processing power used to cluster data. The system may provide the embedded dataset to a set of clustering models to generate a set of clusters from each clustering model of the set of clustering models. Each of the clustering models may cluster the embedded dataset into clusters unique to the respective clustering model, thereby providing diversity among the clusters themselves. A cluster-ensemble model may process the set of clusters to generate a set of ensemble-clusters. By doing so, the cluster-ensemble model may cluster the set of clusters to generate a set of ensemble-clusters, thereby (i) avoiding cluster-based classification bias from the set of clustering models and (ii) avoiding inaccurate clustering of the embedded data from weak clustering models. Moreover, by clustering the set of clusters from the set of clustering models, the system provides a "data first" approach that leverages unspecialized clustering models to accurately segment data without limiting the clusters to a specific set of data segments (e.g., the question first approach)—thereby enabling the data to "speak for itself" rather than be pigeonholed into a given criterion.

In some aspects, the system may receive a raw dataset having a first dimension, where the raw dataset comprises entity identifiers associated with entities that users have interacted with and timestamps at which the users interacted with the entities. The system may then embed the raw dataset into an embedded dataset having a second dimension, where the embedded dataset comprises a vector embedding of the entity identifiers and the timestamps at which the users interacted with the entities. The system provides the embedded dataset to a set of clustering models to generate a set of clusters, where each cluster of the set of clusters corresponds to a respective clustering model of the set of clustering models. The system may then provide the set of clusters to a cluster-ensemble model to generate a set of ensemble-clusters. Using the set of ensemble-clusters, the system may generate a set of data segments corresponding to the set of ensemble-clusters indicating at least one characteristic of a respective ensemble-cluster of the set of ensemble-clusters.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
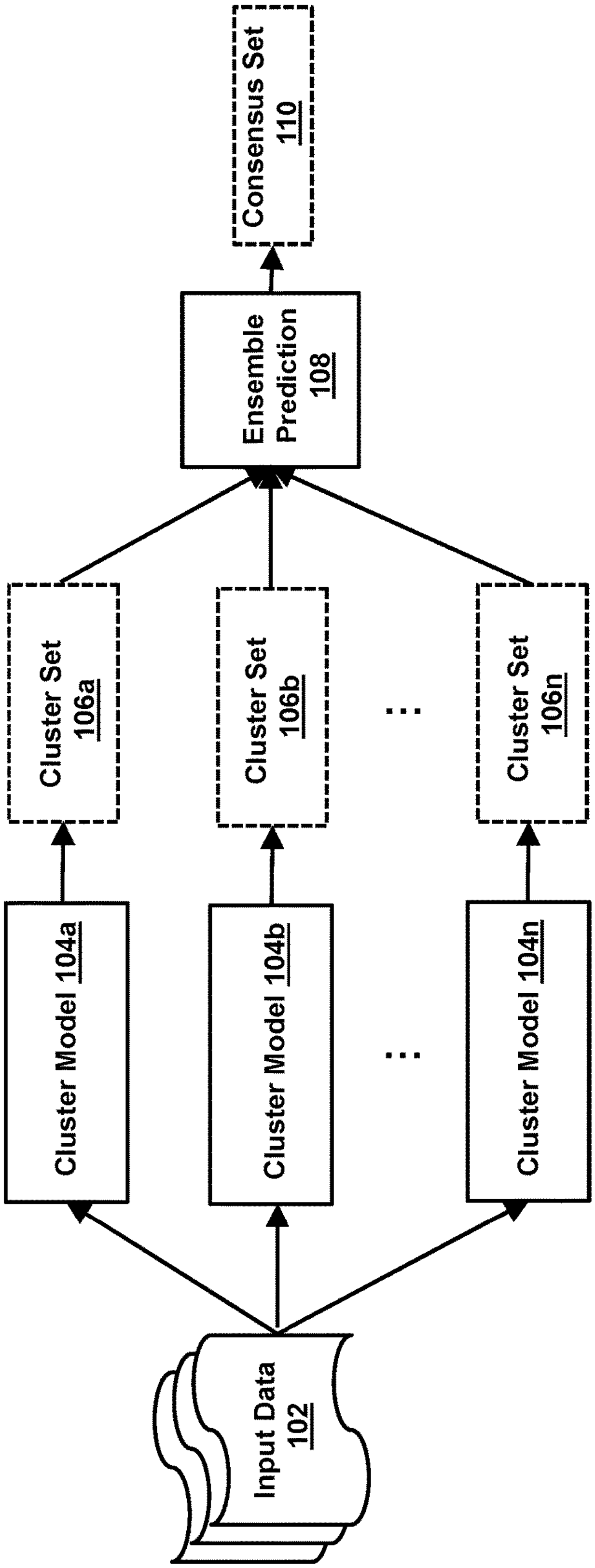
FIG. 1 shows an illustrative diagram for reducing utilization of computational resources associated with segmenting datasets via a cluster-ensemble model, in accordance with one or more embodiments.

FIG. 1 shows an illustrative diagram for reducing utilization of computational resources associated with segmenting datasets via a cluster-ensemble model, in accordance with one or more embodiments. For example, system 100 may indicate input data 102, cluster models 104*a*-104*n* (collectively referred to as cluster model 104), cluster sets 106*a*-106*n* (collectively referred to as cluster set 106), ensemble prediction 108, and consensus set 110, which may be used to reduce computational resources associated with segmenting datasets, in accordance with one or more embodiments. For example, FIG. 1 illustrates input data 102, which may be provided to cluster models 104*a*-104*n*. Cluster models 104*a*-104*n* may cluster the embedded dataset to generate a set of clusters (e.g., cluster sets 106*a*-106*b*). The set of clusters may then be provided to ensemble prediction 108 which may generate consensus set 110. To reduce the amount of computational resources conventionally required to segment datasets, input data 102 may be a modified dataset, such as an embedded dataset. For example, the modified dataset may be a dimensionally reduced dataset that is associated with less memory than that of an unmodified dataset. Cluster models 104*a*-104*n* may process input data 102 to generate cluster sets 106*a*-106*n*. In some embodiments, cluster models 104*a*-104*n* may be separate cluster models each configured to cluster input data 102 and generate a set of clusters that is unique to the model that performed the clustering. By doing so, system 100 provides diversity among the set of clusters, thereby reducing clustering-model classification bias. Cluster sets 106*a*-106*n* may then be provided to ensemble prediction 108. For example, ensemble prediction 108 may be a cluster-ensemble model configured to a set of clusters as input and generate consensus set 110. For instance, consensus set 110 may be a set of ensemble-clusters (e.g., a set of clusters) that represent a clustered set of the set of clusters 106*a*-106*n* generated by clustering models 104*a*-104*n*. As such, system 100 (*i*) avoids inaccurate clustering of the input data from weak clustering models, (ii) leverages a "data first" approach enabling robust and accurate generation of data segments, and (iii) reduces the amount of computational resources conventionally required to segment data when utilizing a "question first" approach caused by the need for specialized clustering models.

In some embodiments, cluster models 104*a*-104*n* may be a supervised or unsupervised machine learning models configured to cluster data into one or more clusters. For example, cluster models 104*a*-104*n* may be neural networks, Affinity Propagation models, Agglomerative Clustering models, BIRCH models, DBSCAN models, K-Means clustering models, Mini-Batch Mean Shift models, OPTICS models, Spectral Clustering models, Mixture of Gaussians models, density-based clustering models, distribution-based clustering models, centroid-based clustering models, hierarchical-based clustering models, or other machine learning/artificial intelligence models configured to cluster data into one or more clusters. In some embodiments, ensemble prediction 108 may be a supervised or unsupervised machine learning model configured to generate a consensus set 110. For example, ensemble prediction 108 may be a cluster-ensemble model that may take in a set of clusters (e.g., cluster sets 106*a*-106*n*) as input and generate a consensus set 110 by clustering the set of clusters. For instance, the consensus set 110 may be a set of ensemble-clusters that is based on cluster sets 106*a*-106*n*. Ensemble prediction 108 may comprise an ensemble function that is trained on outputs of other machine learning models (e.g., cluster models 104*a*-104*n*) to enable modularity (e.g., enhanced prediction performance without modifying existing models) and expandability (e.g., new machine learning models, such as cluster models 104*a*-104*n*, may be changed or swapped out of system 100 easily). The ensemble function may combine inputs (e.g., the outputs, such as the set of clusters 106*a*-106*n*) into a set of ensemble-clusters. In some embodiments, the ensemble function may be a linear or a non-linear combination of the inputs.

The system may be used to reduce utilization of computational resources associated with segmenting datasets via a cluster-ensemble model. In disclosed embodiments, computational resources may include resources or other functions of a computer that are used when segmenting data. In some embodiments, computational resources may include computer memory, such as non-volatile memory (flash memory, Solid-State Drive (SSD), magnetic storage, Read-Only Memory (ROM), Erasable Programmable ROM, Hard Disk Drive (HDD), optical disk, etc.), volatile memory (Random Access Memory (RAM), Dynamic Random Access Memory (DRAM), cache memory, Static Random Access Memory (SRAM), register memory, etc.), or other computer memory or storage devices. In some embodiments, computational resources may include computer processors, such as single-core Central Processing Unit (CPU), dual core CPU, quad-core CPU, hexa-core CPU, octa-core CPU, deca-core CPU, multicore CPU, a set of CPUs, graphical processing units, or other computer processors or processing components. In some embodiments, computational resources may be wall time. For example, wall time may be a maximum time range indicating the time at which a job begins (e.g., processing information, clustering data, segmenting data etc.) to the time at which a job completes, where, during the wall time, a computing device is enabled to access a set of hardware and software components to complete a job.

The system may be used to cluster data leveraging a "data first" approach. For example, a "data first" approach may be an approach used to cluster or segment data (e.g., a dataset) into one or more groupings that does not impose any restrictions or other criteria into or onto a clustering model.

For example, as opposed to a "question first" approach for clustering data that imposes a given question to a model configured to cluster data (e.g., Who drinks coffee?), a "data first" approach forgoes such restriction and enables a clustering model to find similarities within the data based on the data alone. In some embodiments, clustering may be the act of generating groups of data where each group of data shares a common characteristic or common characteristics. In some embodiments, clustering may be the act of dividing data into one or more groups of data where each group shares a common trait or common traits. In some embodiments, clustering may be the act of grouping data including one or more data points into sets of data in such a way that the data (e.g., data points) in a given cluster (e.g., set of data) are more similar to each other than that of the data in a different cluster. In some embodiments, clustering may be based on a statistical approach using the data (or data points within the data itself) as the driving force for clustering the data into one or more groups.

The system may be used to generate data segments to generate an accurate representation of data (e.g., a dataset). In some embodiments, data segments may be data that is grouped into one or more separately labeled groups of data. In some embodiments, data segments may be data that is grouped into one or more separately labeled groups of data with intervention (e.g., predetermined intervention, human intervention, a third-party intervention, a given perspective, etc.). As an example, the system may segment clustered data to generate a set of data segments. In some embodiments, data segments may include one or more labels determined or otherwise assigned to data within a given data segment. For example, such labels may indicate a characteristic of the data within a given data segment. In some embodiments, data segments (or data segmentation) may be based on an intervention approach, such as fitting data into one or more categories or groupings based on data analysis or predetermined knowledge.

Figure 2:
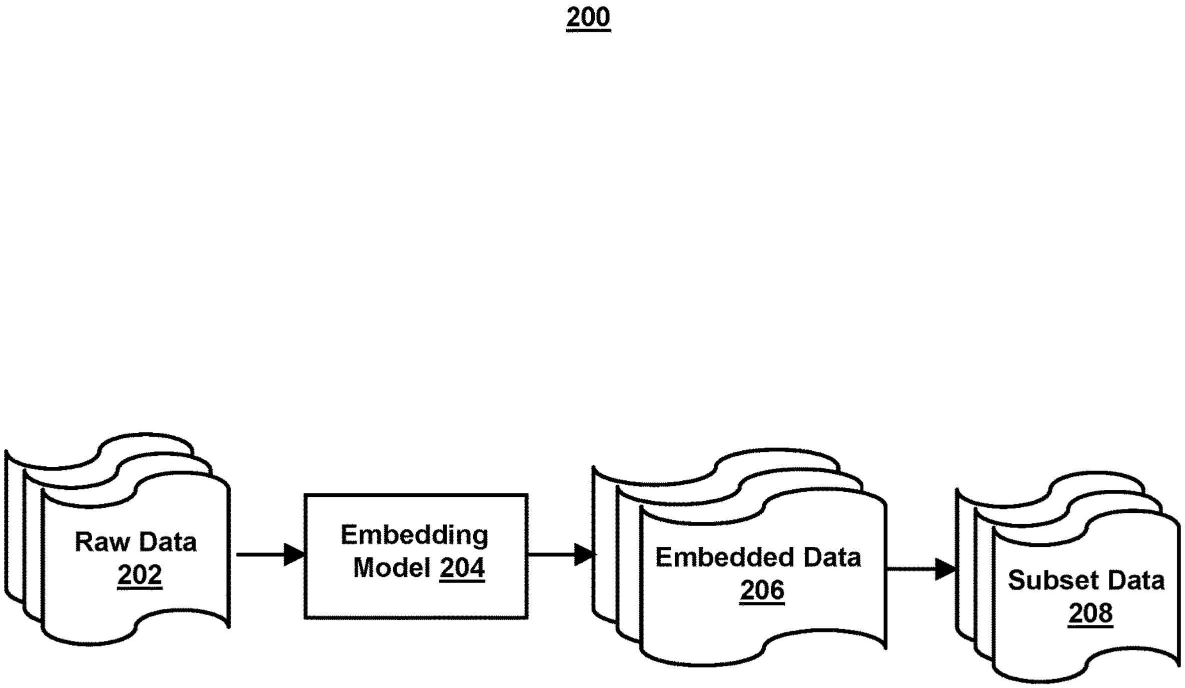
FIG. 2 shows an illustrative diagram for generating embedded data to reduce utilization of computational resources associated with segmenting datasets via a cluster-ensemble model, in accordance with one or more embodiments.

FIG. 2 shows an illustrative diagram for generating embedded data to reduce utilization of computational resources associated with segmenting datasets via a cluster-ensemble model in accordance with one or more embodiments. For example, subsystem 200 may include raw data 202, embedding model 204, embedded data 206, and subset data 208. For example, raw data 202 may be embedded by embedding model 204 to generate embedded data 206. In some embodiments, embedded data 206 may be used to generate subset data 208 (e.g., a subset of embedded data 206, a randomized subset of embedded data 206, etc.). Embedding model 204 may be any embedding model (e.g., machine learning embedding model, artificial intelligence embedding model, Word2Vec, Principal Component Analysis (PCA), Non-Negative Matrix Factorization, Kernel PCA, Graph-based Kernel PCA, Linear Discriminant Analysis (LDA), Generalized Discriminant Analysis (GDA), Autoencoder, T-distributed Stochastic Neighbor Embedding (t-SNE), Uniform Manifold Approximation and Projection (UMAP), or other model) configured to embed data into embedded data. For example, embedding model 204 may be configured to embed, or otherwise transform, raw data 202 into embedded data 206 such that embedded data 206 is associated with a dimension that is less than that of raw data 202. By doing so, the system may reduce the amount of memory associated with raw data 202, enabling system 100 (FIG. 1) to cluster or otherwise segment data (or datasets), effectuating the improvement of reducing the utilization of computational resources associated with segmenting data.

For example, as dataset size increases (e.g., the amount of memory occupied by the data), existing clustering algorithms fail to effectively output meaningful data segments caused by the sheer amount of data points included in the dataset. For instance, where the dataset has a strong correlation between one or more variables, existing clustering models fail to effectively cluster the data into data segments that indicate a characteristic of the data segments due to distance-based clustering (e.g., distances between the data points within the data). On the contrary however, by embedding the data prior to clustering, the embedded data not only reduces the amount of memory used to store the data, thereby also reducing the amount of computer processing power required to process the data, but also modifies the dataset and the distances thereof to enable the clustering model to determine or learn new information inherent in the embedded dataset as opposed to a raw dataset. Moreover, where embedding the data involves dimensionally reducing the data, not only is the complexity of the data reduced (e.g., by dimensional reduction), but distances between the datapoints also change, thereby enabling effective, accurate, and robust generation of data segments that overcome the technical deficiencies of existing systems.

The system may use raw data. In disclosed embodiments, raw data may include any data, dataset, electronic media, or other information. For example, raw data may be an unmodified (e.g., original) set of data received by a system. In some embodiments, raw data may include one or more dimensions. Dimensions may refer to the number of variables within a dataset. For example, a dataset with one variable is a one dimensional dataset, whereas a dataset with seven variables is a seven dimensional dataset.

The system may use embedded data. In disclosed embodiments, embedded data may be data that represents other data in a numerical format that may be expressed as a vector. For example, embedded data, or alternatively, embeddings, may be a different (e.g., numerical, vectorized, etc.) representation of original data (e.g., raw data). In some embodiments, data may be embedded by one or more machine learning models, artificial intelligence models, embedding models, or other embeddings (e.g., predetermined or manual embedding techniques) to generate embedded data. In some embodiments, embedded data may have a dimension. For example, the dimensions of embedded data may refer to the number of variables within the embedded dataset.

Figure 3:
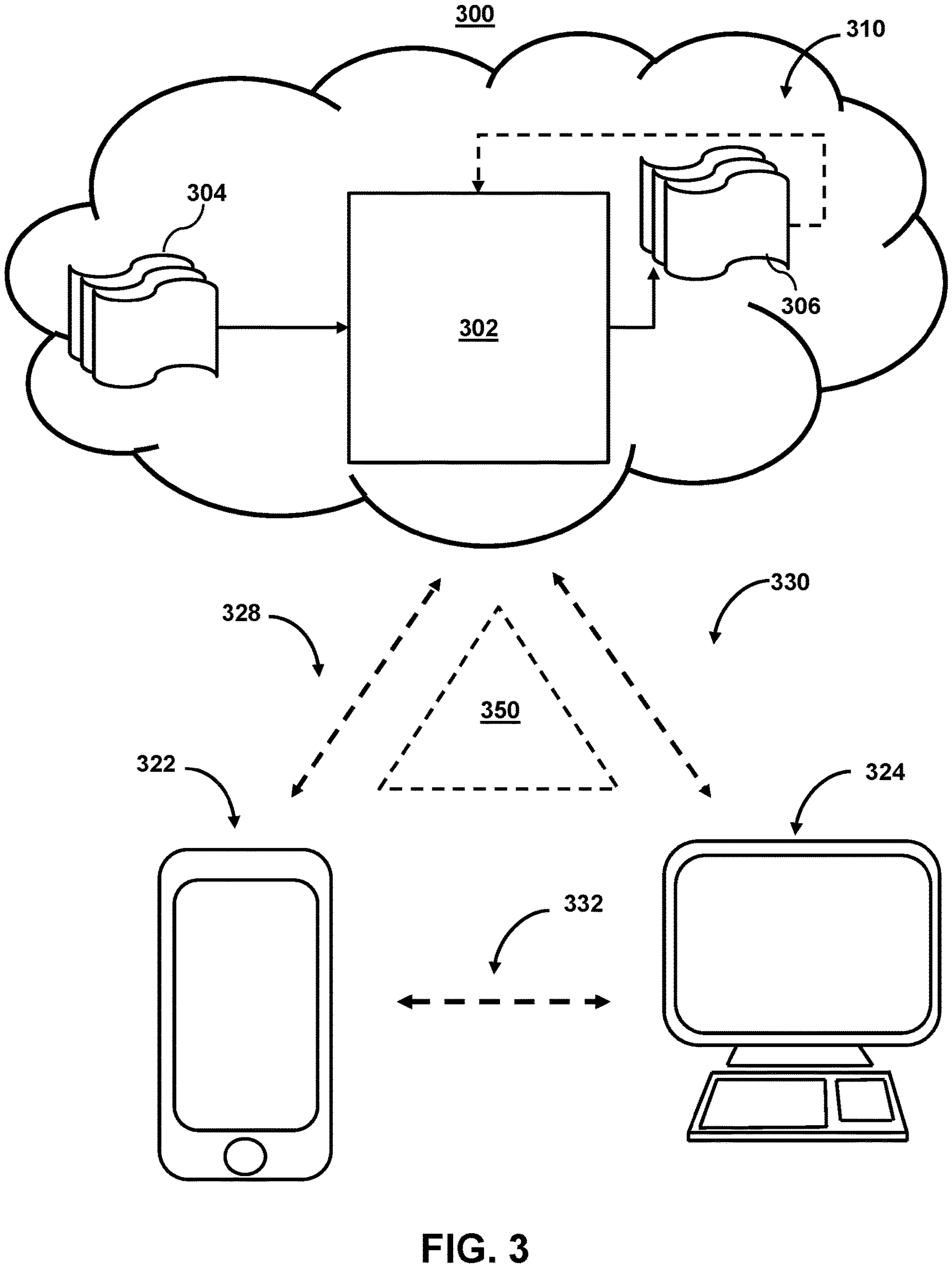
FIG. 3 shows illustrative components for a system used to reduce utilization of computational resources associated with segmenting datasets via a cluster-ensemble model, in accordance with one or more embodiments.

FIG. 3 shows illustrative components for a system used to reduce utilization of computational resources associated with segmenting datasets via a cluster-ensemble model, in accordance with one or more embodiments. For example, FIG. 3 may show illustrative components for generating robust, accurate, and effective data segments efficiently. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones and a personal computer, these displays also act as user input interfaces. It should be noted that in some embodiments, the devices may have neither user input interfaces nor displays and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include input data 102 (FIG. 1), cluster models 104*a*-104*n* (FIG. 1), cluster sets 106*a*-106*n* (FIG. 1), ensemble prediction 108 (FIG. 1), consensus set 110 (FIG. 1), raw data 202 (FIG. 2), embedding model 204 (FIG. 2), embedded data 206 (FIG. 2), subset data 208 (FIG. 2), or other components. In this way, cloud components 310 may host the necessary components to effectuate a reduction in the utilization of computational resources associated with segmenting datasets via a cluster-ensemble model by offloading computationally heavy processes, data, and models from one device (e.g., mobile device 322, user terminal 324) to another device. Additionally, in this way, cloud components 310 may further transmit and receive data related to segmenting data via mobile device 322 or user terminal 324, such as one or more commands, instructions, update information, model information, user inputs, data segments, data clusters, or other information.

Cloud components 310 may access one or more databases. For example, cloud components 310 may access one or more remote or local databases. The databases may store information related to input data, raw data, embedded data, subsets of the embedded data, training data (e.g., training data for machine learning models, clustering models, cluster-ensemble models, embedding models, Natural Language Processing (NLP) models, etc.), entity identifiers, timestamps, user identifiers, ensemble functions, error values, error threshold values, threshold values, machine learning models (e.g., untrained or trained machine learning models, clustering models, cluster-ensemble models, embedding models, NLP models etc.), tables, sizes of entities, frequencies, filtering criterion, filtering criteria, entity characteristics, or other information.

Cloud components 310 may include model 302, which may be a machine learning model, artificial intelligence model, etc. (which may be referred to collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., a set of clusters, a consensus set, a set of ensemble-clusters, embedding data, set of labeled data segments, characteristics of ensemble-clusters, etc.).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., a set of clusters, a consensus set, a set of ensemble-clusters, embedding data, a set of labeled data segments, characteristics of ensemble-clusters, etc.).

In some embodiments, the model (e.g., model 302) may automatically perform actions based on outputs 306. In some embodiments, the model (e.g., model 302) may not perform any actions. The output of the model (e.g., model 302) may be used to generate data segments, provide an ensemble prediction model with input, generate a consensus set, generate embeddings, generate characteristics of a set of clusters, generate characteristics of a set of ensemble-clusters, or generate other information.

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDOS protection, and API layer 350 may use RESTful APIs as standard for external integration.

Figure 4:
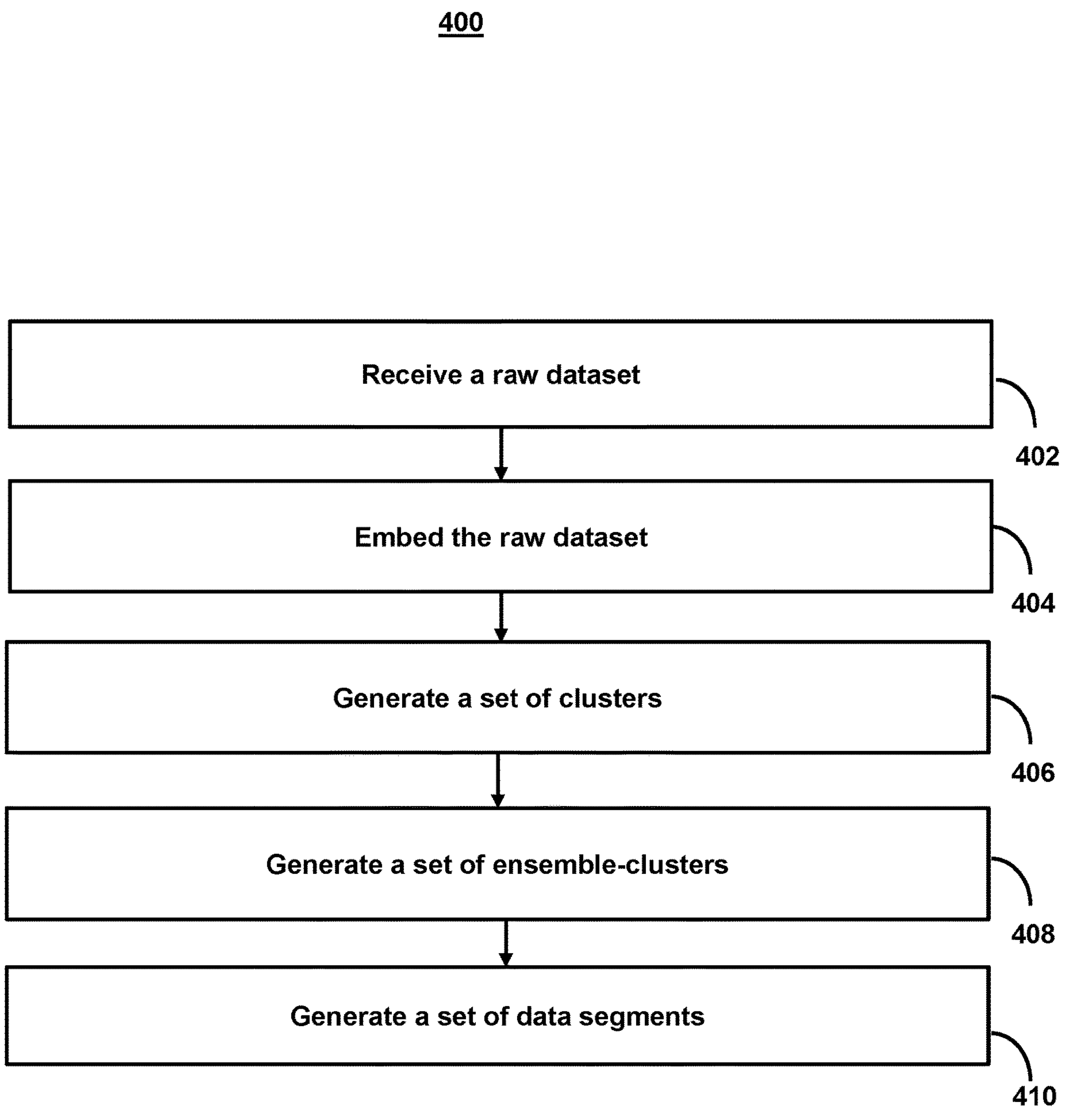
FIG. 4 shows a flowchart of the steps involved in segmenting data, in accordance with one or more embodiments.

FIG. 4 shows a flowchart of the steps involved in segmenting data, in accordance with one or more embodiments. For example, the system may use process 400 (e.g., as implemented on one or more system components described above) to reduce utilization of computational resources associated with segmenting datasets via a cluster-ensemble model, in accordance with one or more embodiments.

At step 402, process 400 (e.g., using one or more components described above) may receive a raw dataset. For example, the raw dataset may be any dataset that may involve user information or other information. The raw dataset may be associated with a first dimension. As discussed above, a dimension (e.g., of data, a dataset, datasets, etc.) may refer to the number of variables included in the data itself. In the context of data analysis, and particularly, big data analysis, raw data may be obtained/received from various resources, such as local databases, remote databases, the internet, crowdsourced data, third-party resources, social media, or other resources. Such data may be collected continuously and as such, may grow exceptionally large in size with hundreds or thousands of dimensions, if not more. Attempting to process (e.g., segment, cluster, or draw insights) from big data is a cumbersome process that may be computationally infeasible given the current limitations of data segmentation processes and the computers that host the appropriate models to process data.

In the context of determining or otherwise generating data segments to categorize users based on their interactions with entities, the raw data may include entity identifiers associated with entities that users have interacted with and timestamps at which the users interacted with the entities. As an example, an entity may be a company, merchant, service provider, organization, or other entity. The system may receive raw data that includes entity identifiers (e.g., identifiers indicating an entity name, title, website, Uniform Resource Locator (URL), Universal Resource Identifier (URI), Merchant Category Code (MCC), etc.), user identifiers (e.g., identifiers indicating users' names, screen names, demographical information, social security numbers, contact information, account numbers, account identifiers, etc.), or timestamps (e.g., dates, times, epoch time, UNIX time, coordinated universal time, etc.).

In some embodiments, the raw data may be transaction information (e.g., transaction history) of multiple users indicating which users shopped at which entities at what time. For example, to determine a data segment to which a user belongs (e.g., contractors, budget travelers, outdoors enthusiasts, upscale travelers, etc.), the system may receive raw transaction data indicating account numbers, merchant identifiers, transaction amounts, timestamps, at which one or more users interacted with the merchants, or other information. In some embodiments, such transaction information may be anonymized to increase data security of the users. In this way, the system may segment users into one or more data segments based on transaction information to provide users with information at which merchants they disproportionately spend at.

In some embodiments, the system may remove information from the raw dataset corresponding to a given entity. For example, the system may extract the set of entity identifiers from the raw dataset. Using the extracted entity identifiers, the system may compare the entity identifiers to another set of entity identifiers to determine a match. For example, the other set of entity identifiers may represent a blacklisted set of entities that should not be included when performing clustering. The blacklisted entities may be entities that users tend to commonly shop at, which may not provide accurate insight as to who the customer actually is.

As such, in response to determining a match, the system may remove information corresponding to the blacklisted entity from the raw dataset. For example, the system may delete information that is associated with the blacklisted entity, such as the user identifiers, timestamps, or other information to reduce the amount of information included in the raw dataset. In this way, the system may reduce the amount of computer processing and memory resources utilized when embedding the raw dataset into an embedded dataset. Additionally, in this way, by removing blacklisted entities from the raw dataset, the system may generate more accurate clusters regarding entities (e.g., merchant, merchant types, etc.) at which users disproportionately transact, thereby providing valuable data segments.

In some embodiments, the system may remove information from the raw dataset corresponding to a given entity based on a size of the entity. For example, the system may extract the set of entity identifiers from the raw dataset and remove information corresponding to an entity that exceeds a threshold value. For instance, the threshold value may be a value that is associated with a size of the entity, such as a number of entity locations, a number of employees employed by the entity, a profit margin of the entity, a revenue of the entity, or other value. The system may determine a value (e.g., a size) of the entity via accessing one or more local or remote databases, accessing predetermined values, web scraping, or other methodologies. In response to the value exceeding the threshold value, the system may remove information from the raw dataset that corresponds to the entity. For example, the system may delete information that is associated with the corresponding entity, such as the user identifiers, timestamps, or other information to reduce the amount of information included in the raw dataset. For instance, large entities (e.g., large brick and mortar stores, supermarkets, large online retailers, etc.) commonly provide a plethora of goods to which users commonly shop at. As such, large entities do not provide valuable insight as to where users may disproportionately shop at or accurately characterize what type of shopper a user is (e.g., to place the user into a unique data segment). Therefore, the system may remove information corresponding to large entities to not only reduce the amount of data to be processed (e.g., to be embedded or otherwise processed), but also enables valuable customer segments to be generated. In this way, the system optimizes the raw dataset by filtering out large/popular entities, thereby providing improved data diversity and more accurate results when determining data segments describing user behavior.

At step 404, process 400 (e.g., using one or more components described above) may embed the raw dataset. For example, the system may embed the raw dataset into an embedded dataset having a second dimension. As discussed above, a problem ever so prevalent with respect to segmenting big data is that existing systems are limited by the computational resources required to segment big data. Due to the large size (e.g., dimensions) of such data, it may be computationally infeasible to use existing data segmentation processes on big data, as the larger the dataset is to segment the more computer memory and processing power is required. Where additional computational resources are unavailable, there is a need to reduce the amount of computational resources required to segment data while providing quick, effective, and accurate generation of data segments. To overcome these technical deficiencies, the system may embed the raw dataset into an embedded dataset that has a second dimension. For example, the embedded dataset may be a dataset that occupies less computer memory, thereby reducing the amount of computer processing power required to segment data. In some embodiments, the embedded dataset may be an embedded representation of the raw data that includes a vector embedding of user identifiers, entity identifiers associated with the entity, or timestamps at which the users interacted with the entities. For example, where the raw dataset includes alphanumeric characters indicating the user identifiers, entity identifiers, or timestamps, the embedded dataset may be a vector embedding of the alphanumeric characters such that each user identifier, entity identifier, or timestamp is in a vectorized format.

In some embodiments, the dimensional size of the embedded data may be less than that of the raw dataset. For example, when the raw dataset is embedded into an embedded dataset, the system may reduce the number of dimensions associated with the raw dataset into an embedded dataset. As opposed to conventional thinking where data analysts believe that "big data" may produce more accurate results, when big, raw, data is provided to clustering models or other data segmentation models, such models often produce near meaningless data segments (or clusters) caused by the sheer amount of datapoints within the data and close distances between the data points themselves. As such, clustering models (or other data segmentation models) struggle to produce meaningful data segments as the density of the data is so high. Moreover, due to the limitations associated with training clustering models or other data segmentation models, such as the requirement for large processing power and large computer memory, when big data is provided to a clustering model for training, it may be computationally infeasible to train a clustering model on a large corpus of data. By dimensionally reducing a dataset for use in training and or providing to a clustering model, not only is the amount of computer processing and memory resources reduced, but it also enables the generation of more accurate clusters.

In some embodiments, the embedded dataset may be generated by providing the raw dataset to an embedding model. The embedded dataset may include a set of rows and a set of columns. For example, the set of rows and the set of columns may be associated with a number of dimensions that the embedded dataset includes. In some embodiments, the rows may correspond to a user identifier associated with a user, and each column may correspond to timestamps at which the user interacted with an entity. In this way, the system may cluster the embedded data to generate accurate and robust clusters directed toward where and when users shop at specific entities. In some embodiments, the rows may correspond to an entity identifier, and each column may correspond to timestamps at which the users have interacted with the entity. In this way, the system may cluster the embedded data to generate accurate and robust clusters directed toward what entities users shop at and what times users typically shop at such entities.

In some embodiments, the system may prefilter the raw dataset prior to embedding the raw dataset. As user behavior changes overtime, to ensure accurate data segments are determined, the system may use a filtered set of raw data. For example, the system may filter the raw dataset based on a predetermined time period (e.g., the most recent day, week, month, year, a predetermined amount of days, weeks, months, years, etc.). For instance, where the predetermined time period is the most recent week, the system may parse the raw dataset and remove transaction data based on the timestamps at which users interacted with entities that have not occurred within the most recent week. As such, the system may generate an updated raw dataset that includes transaction data of users who have interacted with entities within the given week. By doing so, the system reduces the amount of computer processing and memory resources utilized when embedding the raw dataset while ensuring the most accurate data segments are determined.

In some embodiments, the system may generate vector embeddings based on time ranges in which users have interacted with a set of entities. For instance, to accurately determine data segments of user transaction history, users who shop at similar entities (e.g., merchants, companies, stores, etc.) at similar times tend to be of a given "type" or category of shopper. Therefore, prior to embedding the raw dataset, the system may filter the raw dataset into a set of subsets of the raw dataset based on a threshold value. For example, the threshold value may be a predetermined time range such as 5 minutes, 10 minutes, 1 hour, 2 hours, 1 day, 2 days, 1 week, 2 weeks, 1 month, 2 months, a year, or other predetermined time range. The system may then generate the set of subsets of raw data based on the predetermined time range. For example, the system may parse the raw data and generate a first subset of raw data based on the timestamps that users interacted with entities, such that the first subset of raw data includes entities that users have interacted with within the predetermined time range. In some embodiments, the predetermined time range may be the same for all subsets of the set of subsets of raw data, with respect to a given time or date. For instance, each subset of the set of subsets may include entities that users have interacted with within 5 minutes, however, the first subset may be associated with a time/date of Jul. 1, 2023, between 8:00 a.m. and 8:05 a.m., and a second subset may be associated with a time/date of Jul. 1, 2023, between 8:05 a.m. and 8:10 a.m. However, in other embodiments, the predetermined time range may be different for one or more subsets of the set of subsets of raw data, with respect to a given time or date. The system may provide the entity identifiers of the subsets of the raw dataset based on the predetermined time range (e.g., a subset of the raw transaction data where users have shopped at entities within 5 minutes of one another, a day of one another, a week of one another, etc.) to an embedding model to generate the vector embeddings. In this way, the system may generate accurate data segments associated with where and when a user shops at a given entity, thereby generating robust and insightful data segments when provided to the cluster-ensemble model.

At step 406, process 400 (e.g., using one or more components described above) may generate a set of clusters. For example, the system may provide the embedded dataset to a set of clustering models to generate a set of clusters, where each cluster of the set of clusters corresponds to a respective clustering model of the set of clustering models. To generate insightful data segments, the system may provide the embedded dataset to a set of clustering models, where each clustering model generates a set of clusters independently of one another. Each cluster of the set of clusters may include data points representing the embedded dataset (or a portion thereof). For instance, each data point included in a given cluster may correspond to a given transaction of embedded transaction data. In this way, the system generates a set of clusters from each clustering model of the set of clustering models, thereby promoting cluster diversity and generating a plurality of clusters that each correspond to a respective clustering model. Additionally, in this way, the system reduces clustering-based classification bias by utilizing a set of clustering models to cluster the embedded dataset, as opposed to a single clustering model.

In one use case, where the set of clustering models includes a first clustering model and a second clustering model, the system may provide the embedded dataset to (i) the first clustering model to generate a first set of clusters and (ii) a second clustering model to generate a second set of clusters. In some embodiments, the first clustering model and the second clustering model may be the same type of clustering model (e.g., K-means clustering model, Mixture of Gaussians model, OPTICS model, etc.). In other embodiments, the first clustering model and the second clustering model may be different types of clustering models. The first clustering model and the second clustering model may each be trained on a randomized subset of the embedded dataset. For example, to reduce the amount of computer processing and memory resources utilized during clustering model fitting/training, the first and second clustering models may be respectively trained on randomized subsets of the embedded dataset. One of skill in the art would appreciate that other clustering models may exist and, as such, each clustering model may be trained on a randomized subset of the embedded dataset, in accordance with one or more embodiments.

In some embodiments, the system may train each clustering model of the set of clustering models using a subset of training data to reduce the amount of computer processing and memory resources utilized during clustering model training. For example, as opposed to existing methods that train clustering models based on a large corpus of training data, the system trains each clustering model of the set of clustering models on a subset of an embedded dataset. Not only does the subset of the embedded dataset result in a reduction of computer processing and memory resources, but as the training data is an embedded dataset (e.g., which may be dimensionally reduced), the system overcomes disadvantages of existing clustering model training by further reducing the amount of computer processing and memory resources required to train a clustering model.

Furthermore, during clustering model training, each clustering model may determine Euclidean distances between each vector of the vector embeddings (e.g., the data points of the embedded dataset) in the subset of the embedded dataset. The Euclidean distances may be determined with respect to entity identifiers and the timestamps at which users interacted with the entities. For example, in the context of segmenting transaction data or other transaction information, users who shop at similar places at similar times are more closely related than those that (i) shop at similar places at dissimilar times (e.g., customers that rarely visit a given store) or (ii) shop at dissimilar places at similar times (e.g., customers that merely shop on Saturday mornings). In this way, the clustering models may generate more accurate clusters (e.g., based on the determined Euclidean distances) when segmenting the data to determine more accurate transaction clusters when categorizing user data.

In some embodiments, each subset of the embedded dataset used to train the clustering models may be a randomized sample from the embedded dataset. For instance, a common problem faced by existing methods when training clustering models is that when there is too much data, clustering models may produce meaningless clusters. To overcome this, by using a set of clustering models each trained on a randomized subset of the embedded dataset, the clustering models are able to generate different clusters as compared to other models in the set of clustering models. For example, each randomized subset of the embedded dataset may differ from one another, enabling each clustering model of the set of clustering models to be trained on different subsets of training data. By doing so, the system not only reduces the amount of computer processing and memory resources conventionally required to train such clustering models, but also enables the system to produce clusters with increased diversity.

In some embodiments, the system may dynamically replace clustering models of the set of clustering models. For example, the system may determine an error value of a respective clustering model during clustering model training. In response to the error value of the respective clustering model satisfying an error threshold value (e.g., a predetermined error threshold value), the system may replace the respective clustering model with another clustering model. The error value may be determined via clustering model-related evaluation processes or performance metrics, such as silhouette coefficients, Dunn's Index, Rand Index, Mutual Information, V-measure, Fowlkes-allows Scores, Calinski-Harabasz Index, Davies-Bouldin Index, or other metrics. As an example, the error value may satisfy the error threshold value where the error value meets or exceeds the error threshold value. As another example, the error value may satisfy the error threshold value where the error value is within a predetermined range of the error threshold value. The other clustering model (e.g., the clustering model replacing the original clustering model) may be of a different type of clustering model, a new clustering model, or a reparametrized clustering model. In this way, the system may improve data clustering accuracy dynamically in real time or (near real time).

At step 408, process 400 (e.g., using one or more components described above) may generate a set of ensemble-clusters. For example, the system may provide the set of clusters to an ensemble prediction component (e.g., a cluster-ensemble model) to generate a set of ensemble-clusters. The cluster-ensemble model may be a machine learning model configured to take in sets of clusters and generate a set of ensemble-clusters. For example, the cluster-ensemble model may be trained on training data (e.g., sets of clusters) to generate an updated set of clusters with respect to the clusters that are provided to the cluster-ensemble model. That is, the cluster-ensemble model may include a clustering model that comprises an ensemble function that uses information within the set of clusters (e.g., generated via the set of clustering models) to generate a set of ensemble-clusters. As the ensemble function may weight various inputs (e.g., a set of clusters generated by a respective clustering model), the cluster-ensemble model may use such weights to determine a final set of clusters (e.g., the set of ensemble-clusters), thereby generating robust, accurate, and insightful data clusters using a "data first" approach. In some embodiments, the set of ensemble-clusters may be referred to as a "consensus set" of clusters as the set of ensemble-clusters reflects datapoints to which the cluster-ensemble model deems correct based on (i) distances between the datapoints of the clusters and (ii) the variations in the clusters as generated by the set of clustering models.

At step 410, process 400 (e.g., using one or more components described above) may generate a set of data segments. For example, the system may generate, based on the set of ensemble-clusters, a set of data segments corresponding to the set of ensemble-clusters. Each data segment of the set of data segments may indicate at least one characteristic of a respective ensemble-cluster of the set of ensemble-clusters. For example, to effectively categorize users based on their transaction history or determine where users are disproportionately spending to enable such users to make better financial decisions, although user transaction data has been clustered into a set of ensemble-clusters, such ensemble-clusters may be further processed to provide users with a simple, easy to understand data segment.

In some embodiments, the system may generate data segments based on a frequency. For example, to effectively characterize users and their spending habits (e.g., which users spend disproportionately at particular merchants), the system first determines entity characteristics of the raw dataset and frequencies associated with each entity characteristic. The entity characteristic may be a category, value (e.g., MCC), merchant name, business name, entity identifier, or other characteristic associated with an entity. The frequency may be a frequency at which all users (e.g., customers) have interacted with an entity associated with a given entity characteristic. In this way, the system calculates a baseline frequency for users shopping at merchants having a given MCC (e.g., entity characteristic), thereby reducing large data variance when determining where users are disproportionately spending.

The system then determines, for each cluster of the set of ensemble-clusters, whether a second frequency of the entity characteristics that are part of the respective ensemble-cluster meets or exceeds the first frequency. In response to the second frequency meeting or exceeding the first frequency, the system generates a data segment comprising the entity characteristics (e.g., MCCs) that exceed the baseline frequency. In this way, the system accurately segments users into one or more categories via a question "second" approach, thereby eliminating induced data bias from the "question first" approach.

Figure 5:
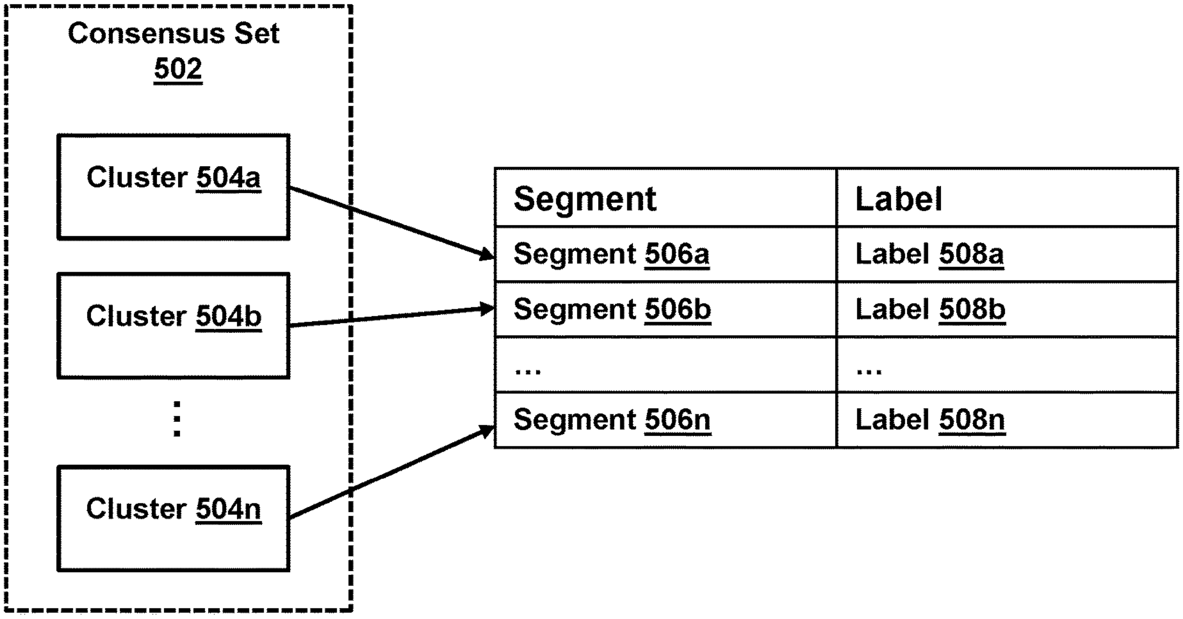
FIG. 5 shows an illustrative diagram for generating a set of data segments corresponding to a set of ensemble-clusters, in accordance with one or more embodiments.

In one use case, for a given ensemble-cluster, the system may use the entity identifiers (e.g., MCCs, merchant name, business name, etc.) within the cluster to determine a frequency at which users in the cluster have interacted with a type of MCC. For instance, FIG. 5 shows an illustrative diagram for generating a set of data segments corresponding to a set of ensemble-clusters, in accordance with one or more embodiments. For example, where the given ensemble-cluster (e.g., cluster 504*a*) of the set of ensemble-clusters (e.g., consensus set 502) includes 10 data points, where four of the data points within the cluster correspond to an MCC of "MCC 5200," three of the data points correspond to an MCC of "MCC 5211," and three of the data points correspond to an MCC of "MCC 5231," the system may determine whether the frequency at which each MCC is disproportional to the baseline frequency (e.g., of the raw dataset). For instance, where the raw dataset determines that only 3% of users shop at MCC 5200, 2% of users shop at MCC 5211, and that 1% of users shop at MCC 5231, the system may determine that the users within the ensemble-cluster disproportionately shop at such merchants (e.g., as 40% exceeds 3%, 30% exceeds 2%, and 30% exceeds 1%). As such, the system may characterize the ensemble-cluster by generating a data segment (e.g., segment 506*a*) including the MCCs of the entities included in the given ensemble-cluster. Additionally or alternatively, the system may access one or more remote or local databases to determine an alphanumerical value corresponding to the MCCs within the data segment. For instance, the system may determine that MCC 5200 corresponds to "Home Supply Warehouse Stores," MCC 5211 corresponds to "Lumber and Building Materials Stores," and that MCC 5231 corresponds to "Paint and Wallpaper stores." The system may then perform NLP on "Home Supply Warehouse Stores," "Lumber and Building Materials Stores," and "Paint and Wallpaper stores" to generate a characteristic or label (e.g., label 508*a*) describing the data segment of "Contractors." In this way, users may be categorized into one or more data segments in an easily understood format, thereby providing users with information regarding which types of merchants where they disproportionately are spending.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising: embedding a raw dataset having a first dimension into an embedded dataset having a second dimension, wherein the embedded dataset comprises a vector embedding of entity identifiers associated with entities and timestamps at which users interacted with the entities; providing the embedded dataset to a set of clustering models to generate a set of clusters, wherein each cluster of the set of clusters corresponds to a respective clustering model of the set of clustering models; providing the set of clusters to a cluster-ensemble model to generate a set of ensemble-clusters; and generating, based on the set of ensemble-clusters, a set of data segments corresponding to the set of ensemble-clusters.
2. The method of any one of the preceding embodiments, further comprising: receiving the raw dataset.
3. The method of any one of the preceding embodiments, wherein the raw dataset has a first dimension comprising the entity identifiers associated with the entities that the users have interacted with and the timestamps at which the users interacted with the entities.
4. The method of any one of the preceding embodiments, wherein the raw dataset further comprises user identifiers associated with the users.
5. The method of any one of the preceding embodiments, further comprising: extracting, from the raw dataset, the set of entity identifiers associated with entities that users have interacted with; comparing each entity identifier of the set of entity identifiers to a predetermined set of entity identifiers to determine a match; in response to determining the match between a respective entity identifier of the set of entity identifiers and a respective entity identifier of the predetermined set of entity identifiers, removing information from the raw dataset that corresponds to the respective entity identifier, wherein the match is determined.
6. The method of any one of the preceding embodiments, further comprising: extracting, from the raw dataset, the set of entity identifiers associated with entities that users have interacted with; determining, for each entity identifier of the set of entity identifiers, a value associated with a size of the entity; in response to the value associated with the size of the entity exceeding a threshold value, removing information from the raw dataset that corresponds to the entity, wherein the value associated with the size of the entity exceeds the threshold value.
7. The method of any one of the preceding embodiments, further comprising: embedding the raw dataset, based on a vector embedding, into an embedded dataset having a second dimension that is less than that of the first dimension, wherein the embedded dataset comprises an embedding of (i) the user identifier, (ii) the entity identifier associated with the entity, and (iii) the timestamp at which the user interacted with the entity.
8. The method of any one of the preceding embodiments, wherein the second dimension is less than that of the first dimension.

9. The method of any one of the preceding embodiments, wherein embedding the raw dataset into the embedded dataset comprises providing the raw dataset to an embedding model to generate the embedded dataset having a set of rows and a set of columns, wherein each row corresponds to a user identifier associated with a user and each column corresponds to one or more timestamps at which the user interacted with an entity.

10. The method of any one of the preceding embodiments, wherein embedding the raw dataset into the embedded dataset comprises providing the raw dataset to an embedding model to generate the embedded dataset having a set of rows and a set of columns, wherein each row corresponds to an entity identifier and each column corresponds to one or more timestamps at which users interacted with the entity.

11. The method of any one of the preceding embodiments, further comprising: prior to embedding the raw dataset into the embedded dataset, filtering the raw dataset based on a threshold value, wherein the threshold value is a predetermined time range; and updating the raw dataset based on the filtering of the raw dataset.

12. The method of any one of the preceding embodiments, further comprising: prior to embedding the raw dataset into the embedded dataset, filtering the raw dataset into a set of subsets of the raw dataset based on a threshold value, wherein the threshold value is a predetermined time range; for each subset of the raw dataset, providing the entity identifiers of the respective subset of the raw dataset to an embedding model to generate the vector embeddings.

13. The method of any one of the preceding embodiments, wherein each clustering model of the set of clustering models is trained by: providing a subset of the embedded dataset to the respective clustering model; determining, via the respective clustering model, a Euclidean distance between each vector of the vector embeddings in the subset of the embedded dataset with respect to (i) the entity identifiers and (ii) the timestamps at which the users interacted with the entities; and generating, via the respective clustering model, a first set of clusters based on the determined Euclidean distances.

14. The method of any one of the preceding embodiments, wherein the subset of embedded dataset is randomly sampled from the embedded dataset.

15. The method of any one of the preceding embodiments, further comprising: determining an error value of the respective clustering model; and in response to the error value satisfying an error threshold value, replacing the respective clustering model with a second clustering model.

16. The method of any one of the preceding embodiments, wherein generating the set of data segments further comprises: determining (i) an entity characteristic associated with each entity of the set of entities of the raw dataset and (ii) a first frequency associated with the entity characteristic; determining, for each cluster of the set of ensemble-clusters, whether a second frequency associated with a second entity characteristic of the entities that are part of the respective ensemble-cluster meets or exceeds the first frequency for corresponding entities; and in response to the second frequency meeting or exceeding the first frequency, generating a first data segment, wherein the second frequency meets or exceeds the first frequency.

17. The method of any one of the preceding embodiments, further comprising: performing Natural Language Processing (NLP) on entity characteristics that are part of the first data segment to generate the at least one characteristic.

18. A tangible, non-transitory, machine-readable medium storing instructions that, when executed by a data processing apparatus, cause the data processing apparatus to perform operations comprising those of any of embodiments 1-17.

19. A system comprising one or more processors; and memory storing instructions that, when executed by the processors, cause the processors to effectuate operations comprising those of any of embodiments 1-17.

20. A system comprising means for performing any of embodiments 1-17.

What is claimed is:

1. A system for reducing utilization of computational resources associated with segmenting datasets via a cluster-ensemble model, the system comprising:

one or more processors executing computer program instructions that, when executed, cause operations comprising:

receiving a raw dataset having a first dimension comprising (i) user identifiers of users, (ii) entity identifiers associated with entities that the users interacted with, and (iii) a timestamps at which the users interacted with the entities;

embedding the raw dataset into an embedded dataset having a second dimension that is less than that of the first dimension, wherein the embedded dataset comprises vector embeddings of (i) the user identifiers, (ii) the entity identifiers associated with the entities, and (iii) the timestamps at which the users interacted with the entities;

training a first clustering model and a second clustering model by:

providing (i) a first subset of the embedded dataset as input to the first clustering model and (ii) a second subset of the embedded dataset as input to the second clustering model;

determining, via the first clustering model, first Euclidean distances between each vector embedding of the vector embeddings in the first subset of the embedded dataset with respect to (i) the entity identifiers and (ii) the timestamps at which the users interacted with the entities; and determining, via the second clustering model, second Euclidean distances between each vector embedding of the vector embeddings in the second subset of the embedded dataset with respect to (i) the entity identifiers and (ii) the timestamps at which the users interacted with the entities;

providing the embedded dataset as input to (i) the first clustering model to generate a first set of clusters based on the first Euclidean distances and (ii) the second clustering model to generate a second set of clusters based on the second Euclidean distances;

providing the first set of clusters and the second set of clusters to the cluster-ensemble model comprising an ensemble function to generate a set of ensemble-clusters; and generating, based on the set of ensemble-clusters, a set of labeled data segments corresponding to the set of ensemble-clusters indicating at least one characteristic of a respective ensemble-cluster of the set of ensemble-clusters.

2. A method for reducing utilization of computational resources associated with segmenting datasets via a cluster-ensemble model, the method comprising:

receiving a raw dataset having a first dimension comprising entity identifiers associated with entities that users have interacted with and timestamps at which the users interacted with the entities;

extracting, from the raw dataset, the entity identifiers associated with the entities that the users have interacted with;

determining, for each entity identifier of the entity identifiers, a value associated with a size of the entity associated with the entity identifier;

in response to the value associated with the size of the entity exceeding a threshold value, removing information from the raw dataset that corresponds to the entity, wherein the value associated with the size of the entity exceeds the threshold value;

embedding the raw dataset into an embedded dataset having a second dimension, wherein the embedded dataset comprises vector embeddings of the entity identifiers and the timestamps at which the users interacted with the entities;

providing the embedded dataset as input to a set of clustering models to generate a set of clusters, the set of clusters being based on distances between the vector embeddings of a subset of the embedded dataset, wherein each cluster of the set of clusters corresponds to a respective clustering model of the set of clustering models;

providing the set of clusters to the cluster-ensemble model to generate a set of ensemble-clusters; and generating, based on the set of ensemble-clusters, a set of data segments corresponding to the set of ensemble-clusters indicating at least one characteristic of a respective ensemble-cluster of the set of ensemble-clusters.

3. The method of claim 2, wherein each clustering model of the set of clustering models are trained by:

providing the subset of the embedded dataset to the respective clustering model;

determining, via the respective clustering model, the distances between each vector of the vector embeddings in the subset of the embedded dataset with respect to (i) the entity identifiers and (ii) the timestamps at which the users interacted with the entities, wherein the distances are Euclidean distances; and generating, via the respective clustering model, a first set of clusters based on the determined Euclidean distances.

4. The method of claim 3, wherein the subset of the embedded dataset is randomly sampled from the embedded dataset.

5. The method of claim 3, further comprising:

determining an error value of the respective clustering model; and in response to the error value satisfying an error threshold value, replacing the respective clustering model with a second clustering model.

6. The method of claim 2, wherein the second dimension is less than that of the first dimension.

7. The method of claim 2, wherein embedding the raw dataset into the embedded dataset comprises providing the raw dataset to an embedding model to generate the embedded dataset having a set of rows and a set of columns, wherein each row corresponds to a user identifier associated with a user and each column corresponds to one or more timestamps at which the user interacted with an entity.

8. The method of claim 2, wherein embedding the raw dataset into the embedded dataset comprises providing the raw dataset to an embedding model to generate the embedded dataset having a set of rows and a set of columns, wherein each row corresponds to an entity identifier and each column corresponds to one or more timestamps at which users interacted with the entity associated with the entity identifier.

9. The method of claim 2, further comprising:

extracting, from the raw dataset, the entity identifiers associated with the entities that the users have interacted with;

comparing each entity identifier of the entity identifiers to a predetermined set of entity identifiers to determine a match; and in response to determining the match between a respective entity identifier of the entity identifiers and a respective entity identifier of the predetermined set of entity identifiers, removing information from the raw dataset that corresponds to the respective entity identifier, wherein the match is determined.

10. The method of claim 2, wherein generating the set of data segments further comprises:

determining (i) an entity characteristic associated with each entity of the entities of the raw dataset and (ii) a first frequency associated with the entity characteristic;

determining, for each cluster of the set of ensemble-clusters, whether a second frequency associated with a second entity characteristic of the entities that are part of the respective ensemble-cluster meets or exceeds the first frequency for corresponding entities; and in response to the second frequency meeting or exceeding the first frequency, generating a first data segment, wherein the second frequency meets or exceeds the first frequency.

11. The method of claim 10, further comprising:

performing Natural Language Processing (NLP) on entity characteristics that are part of the first data segment to generate the at least one characteristic.

12. The method of claim 2, further comprising:

prior to embedding the raw dataset into the embedded dataset, filtering the raw dataset based on a second threshold value, wherein the second threshold value is a predetermined time range; and updating the raw dataset based on the filtering of the raw dataset.

13. The method of claim 2, further comprising:

prior to embedding the raw dataset into the embedded dataset, filtering the raw dataset into a set of subsets of the raw dataset based on a second threshold value, wherein the second threshold value is a predetermined time range; and for each subset of the raw dataset, providing the entity identifiers of the respective subset of the raw dataset to an embedding model to generate the vector embeddings.

14. One or more non-transitory, computer-readable media comprising instructions that, when executed by one or more processors, cause operations comprising:

embedding a raw dataset having a first dimension into an embedded dataset having a second dimension, wherein the embedded dataset comprises vector embeddings of entity identifiers associated with entities and timestamps at which users interacted with the entities;

providing the embedded dataset to a set of clustering models to generate a set of clusters, the set of clusters being based on determined distances between the vector embeddings of a subset of the embedded dataset, wherein each cluster of the set of clusters corresponds to a respective clustering model of the set of clustering models;

providing the set of clusters to a cluster-ensemble model to generate a set of ensemble-clusters; and generating, based on the set of ensemble-clusters, a set of data segments corresponding to the set of ensemble-clusters, wherein a first data segment of the set of data segments is generated via:

determining (i) an entity characteristic associated with each entity of the entities of the raw dataset and (ii) a first frequency associated with the entity characteristic;

determining, for each cluster of the set of ensemble-clusters, whether a second frequency associated with a second entity characteristic of the entities that are part of the respective ensemble-cluster meets or exceeds the first frequency for corresponding entities; and in response to the second frequency meeting or exceeding the first frequency, generating the first data segment, wherein the second frequency meets or exceeds the first frequency.

15. The one or more non-transitory, computer-readable media of claim 14, wherein each clustering model of the set of clustering models is trained by:

providing the subset of the embedded dataset to the respective clustering model;

determining, via the respective clustering model, the distances between each vector of the vector embeddings in the subset of the embedded dataset with respect to (i) the entity identifiers and (ii) the timestamps at which the users interacted with the entities, wherein the distances are Euclidean distances; and generating, via the respective clustering model, a first set of clusters based on the determined Euclidean distances.

16. The one or more non-transitory, computer-readable media of claim 15, wherein the subset of the embedded dataset is randomly sampled from the embedded dataset.

17. The one or more non-transitory, computer-readable media of claim 15, wherein the instructions that, when executed by the one or more processors, further cause operations comprising:

determining an error value of the respective clustering model; and in response to the error value satisfying an error threshold value, replacing the respective clustering model with a second clustering model.

18. The non-transitory, computer-readable media of claim 14, wherein the second dimension is less than that of the first dimension.

19. The one or more non-transitory, computer-readable media of claim 14, wherein the instructions that, when executed by the one or more processors, further cause operations comprising performing Natural Language Processing (NLP) on entity characteristics that are part of the first data segment to generate at least one characteristic, wherein the first data segment indicates the at least one characteristic.

20. The one or more non-transitory, computer-readable media of claim 14, wherein the instructions that, when executed by the one or more processors, further cause operations comprising:

prior to embedding the raw dataset into the embedded dataset, filtering the raw dataset based on a threshold value, wherein the threshold value is a predetermined time range; and updating the raw dataset based on the filtering of the raw dataset.

* * * * *